Feb. 14, 1939.   F. MESSINA   2,147,451
SKID PREVENTING DEVICE
Filed Feb. 24, 1937

INVENTOR.
Frank Messina
BY
ATTORNEY.

Patented Feb. 14, 1939

2,147,451

UNITED STATES PATENT OFFICE 2,147,451

SKID PREVENTING DEVICE

Frank Messina, Kansas City, Mo.

Application February 24, 1937, Serial No. 127,388

6 Claims. (Cl. 188—5)

This invention relates to skid preventing attachments for vehicles such as automobiles, trucks, trailers and the like and the primary object is the provision of simple, effective, rugged, durable and quickly operated structure that may be easily attached to the automobile either when the same is made at the factory or after the automobile has been driven a time and the owner wishes to equip the same with a skid preventing attachment.

One of the important aims of this invention is the provision of skid preventing means for automobiles which includes elements for positively engaging the road or other supporting surface so that the effect of slick surfaces may be overcome by elements which actually penetrate ice or a film of water and grip, by penetration, the actual road material.

A yet further object of this invention is to provide unique ways of mounting all of the various elements of the skid preventing structure so that the surface engaging parts of the attachment will always follow the road surface regardless of its condition.

An even further aim of the invention is the contemplation of floating operating mechanism which will have the inherent quality of overcoming destructive forces that would otherwise injure the mechanism if all of the parts thereof were rigidly and immovably secured together.

The foregoing broad objects will be more definitely disclosed during the specification wherein a large number of minor, but very important objects, will be explained.

It is well understood by those skilled in the art that means for preventing skidding of automobiles or other vehicles are relatively ineffective unless there is some positive connection between the frame or other rigid part of the vehicle and the supporting surface thereof. The use of sand has been previously tested but it is found that when a vehicle starts to skid the sand spreading attachment carried thereby is inadequate because of its failure to spread the sand in paths followed by any of the wheels of the automobile. Tests have proven that any skid preventing attachment that is effective must be entirely independent of the traction or guide wheel of the automobile and therefore, the structure embodying this invention includes means for positively gripping the road surface and establishing a connection between such surface and the frame of the vehicle.

One embodiment of the invention is illustrated in the accompanying drawing and enough of the parts of an automobile have been illustrated to teach the manner of equipping such a vehicle with the unique skid preventing attachment. The automobile is usually provided with side frame members 8 that are supported above a pair of traction wheels 10 and guide wheels 12. In the instance illustrated one of traction wheels 10 has been entirely removed to permit showing the nature of one of the gripping levers. The frame members 8 are joined by suitable cross members 14 upon which is mounted the floating manually operative releasing mechanism.

Figure 1:
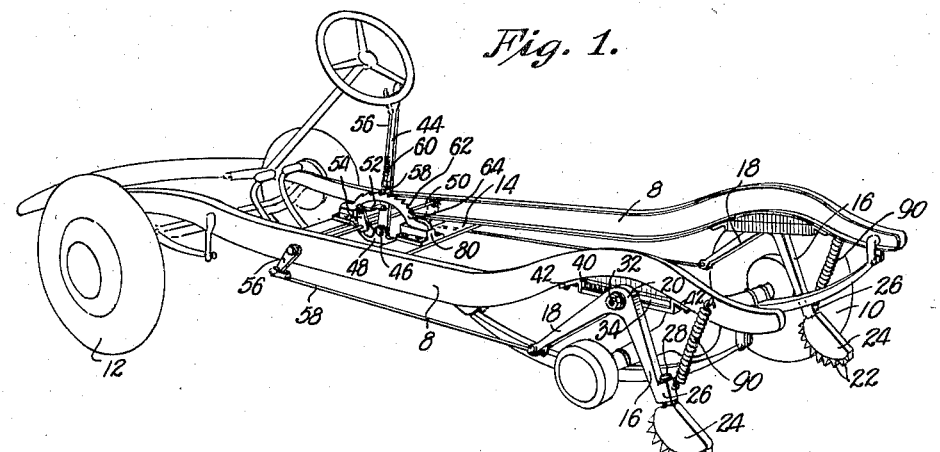
Figure 1 is a perspective view of a portion of an automobile showing the same equipped with skid preventing attachments made to embody the present invention.
Figure 2:
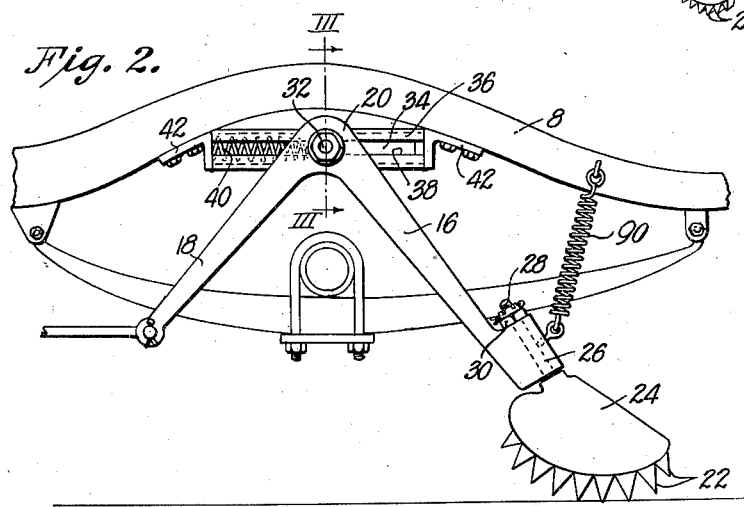
Fig. 2 is an enlarged detailed fragmentary side elevation of a portion of the automobile frame which supports the gripping member of the attachment.
Figure 3:
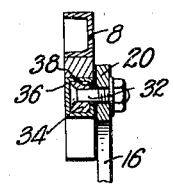
Fig. 3 is a fragmentary detailed sectional view taken on line III—III of Fig. 2.

When installing the skid preventing attachment care should be taken to provide a road gripping member adjacent each of the traction wheels 10. This feature, however, is not a qualifying one and it is conceivable that such a road gripping element might be provided adjacent each one of the wheels of the automobile or that but one gripping element might be provided at a point intermediate the rear or traction wheels 10 of the vehicle. For purpose of fully disclosing the invention however, each frame member 8 carries a bell crank lever of conventional character which has an arm 16, an arm 18 and an elbow portion 20. Arms 16 and 18 merge at elbow 20 and the free end of arm 16 is provided with spurs or other gripping elements 22 that are a part of a removable foot 24. This foot 24 is mounted upon the end of arm 16 through the medium of a bearing 26 and neck 28. Nut 30 screw threaded upon neck 28 maintains foot 24 in operative position. The road surface engaging face of foot 24 is arched as illustrated in Figs. 1 and 2 and the ends of spurs 22 are on an arcuate plane tangent to the plane of the supporting surface so that as the bell crank lever pivots about the supporting bolt 32 the ends of some of spurs 22 will always be effective as gripping elements. Bolt 32 extends through an opening formed at the elbow 20 and is carried by a block 34 slidably mounted in the tubular mounting bracket 36. This bracket is provided with a longitudinal slot 38 through which passes bolt 32 and a spring 40, housed in bracket 36, urges block 34 and the associated parts toward one end of the path of travel of bolt 32. Bracket 36 is secured to frame 8 through fixtures 42 and when the parts are in the operative position as disclosed by Fig. 2, springs 40 will serve as a buffer for block 34 and also as a compensator for the varying distances that may be set up between pivotal point 32 and foot 24 due to unevenness in the road surface. The special operating mechanism is preferably disposed close to the driver of the automobile and the same comprises a lever 44 pivotally mounted by pintle 46 to a bracket 48 that is carried by time members 14. As lever 44 is oscillated about the axis of pintle 46 it will rotate transverse shaft 50 through the medium of link 52 and arm 54. A laterally extending arm 56 on the end of shaft 50 is joined to the end of arm 18 by rod 58 and as shaft 50 is rotated, the bell crank lever will be swung about the axis of bolt 32. This pivotal movement is augmented by any sliding movement on the part of bolt and block 32 and 34 respectively that may be necessary to effectively force the spurs 22 into the supporting surface. The force is great enough to penetrate ice, snow or film of water and also great enough to transfer some of the load of the vehicle from wheels 10 to arm 16 and foot 24.

Lever 44 is equipped with the usual releasable latch including rod 56, dog 58 and spring 60. Dog 58 progressively engages the ratchet teeth 62 of segment 64 so as to hold lever 44 against movement in one direction as the skid preventing attachment is drawn to the operative condition. When the operating mechanism has been moved to dispose foot 24 against the road or other supporting surface, sudden jars due to change in road surface condition may injure the operating mechanism unless it is provided with structure such as detailed in Figs. 4 and 5.

Figure 4:
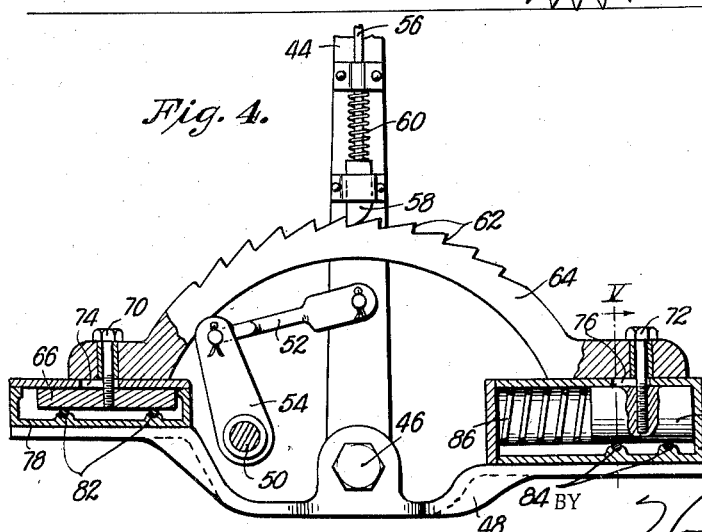
Fig. 4 is an enlarged fragmentary detailed view of the operating mechanism of the skid preventing attachment, parts thereof being shown in section for clearness.
Figure 5:
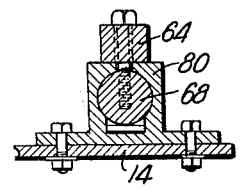
Fig. 5 is a cross sectional view taken on line V—V of Fig. 4 looking in the direction of the arrow.

Segment 64 is secured to a block 66 at one end and to a piston 68 at the other end thereof. Bolts 70 and 72 pass through slots 74 and 76 provided in block housing 78 and piston housing 80 so that segment 64 may be reciprocated. Roller bearings 82 support block 66 and similar roller bearings 84 support piston 68 so that reciprocating movement may take place without undue friction. Spring 86 housed in cylinder 80 yieldably maintains piston 68 at one end of its path of travel and when the operating mechanism is locked as shown in Fig. 4 and there is a tendency for the bell crank lever and associated parts to move shaft 50 in one direction about its axis, spring 86 will serve as a buffer to relieve the force yet to maintain all of the parts of the skid preventing attachment in fully operative position. Spring 86 is strong enough to hold segment 64 against movement unless some undue strain is exerted and does not effect the normal operation of lever 44 and the parts carried thereby. In combining buffer spring 86 and spring 40 with specially arched foot 24, the gripping effect required cannot be defeated by a change in contour of the road or supporting surface spring 90 functions to yieldably hold foot 24 and associated parts of the structure in a raised or inoperative position when lever 44 is moved to release and assist said parts to that position.

It is conceivable that the attachments embodying this invention may be made to present different appearing structure than that shown and described and it is understood that changes and modifications might be made without departing from the spirit of the invention or scope of the appended claims.

What I claim as new and desire to be secured by Letters Patent is:

1. The combination with an automobile having a frame and a pair of traction wheels, of skid preventing structure comprising a bell crank lever adjacent one of the traction wheels having one end engaging the supporting surface when in the operative position; manually operative means in connection with the other end for moving the lever to the operative position; and a mounting bracket pivotally and slidably interconnecting the frame and elbow of the bell crank lever, said manually operative means comprising a pivotally mounted lever, a segment for holding the lever against accidental movement, means interconnecting the lever and said other end into bell crank lever, and means yieldably holding the said segment.

2. The combination with an automobile having a frame and a pair of traction wheels, of skid preventing structure comprising a bell crank lever adjacent one of the traction wheels having one end engaging the supporting surface when in the operative position; manually operative means in connection with the other end for moving the lever to the operative position; and a mounting bracket pivotally and slidably interconnecting the frame and elbow of the bell crank lever, said bracket comprising a longitudinally slotted body secured to the frame, a block slidably carried by the body, a pivot pin mounted in the block and journalled in the bell crank lever at the elbow thereof, and a spring housed in the body and engaging the block to urge the block in one direction, said manually operative means comprising a pivotally mounted lever, a segment yieldably connected to the frame for holding the lever in a selected one of a number of positions, and means interconnecting the lever and said other end of the bell crank lever whereby upon vertical movement of the end of the bell crank lever engaging the supporting surface, the said spring and said yieldably mounted segment will serve to absorb the movement while the structure is operating.

3. The combination with an automobile having a frame and a pair of traction wheels, of skid preventing structure comprising a lever pivotally connected to the frame; yieldable means for maintaining one end of the lever in an inoperative position off the supporting surface of the automobile; and manually operative means for moving the end of the lever into engagement with the supporting surface of the automobile comprising a lever provided with a dog, a ratchet segment, and elements mounting the segment upon the frame to permit reciprocation thereof to a limited degree, said elements being provided with a spring urging the same toward one end of their path of travel.

4. The combination with an automobile having a frame and a pair of traction wheels, of skid preventing structure comprising a bell crank lever provided with spurs on one end thereof; means pivotally and slidably interconnecting the frame and the elbow portion of said bell crank lever; a spring at the said interconnection urging the lever toward one end of its path of travel; a shaft; a rod joining the shaft and the other end of said bell crank lever; an operating lever for rotating the shaft about its axis to move the rod; a dog on the operating lever; a ratchet segment engaged by the dog to releasably prevent movement of the operating lever in one direction; blocks on the ends of the segment; guides slidably housing the blocks; and a spring in one of said guides to urge the blocks and ratchet segment toward one end of their path of travel to yieldably maintain the segment in position when the parts of the skid preventing structure are in the operative position.

5. In a skid preventing structure for automobiles having means for engaging the road surface, mechanism for moving the said means to and from the operative position comprising a lever pivotally mounted upon the frame at one end of the lever; a segment engaging the lever intermediate its ends for holding the lever in a selected position; means for yieldably securing the segment to the frame of the automobile; and links joining the lever and said means for engaging the road surface.

6. In a skid preventing structure for automobiles having means for engaging the road surface, mechanism for moving the said means to and from the operative position comprising a lever pivotally mounted upon the frame at one end of the lever; a segment engaging the lever intermediate its ends for holding the lever in a selected position; means for yieldably securing the segment to the frame of the automobile; and links joining the lever and said means for engaging the road surface, said links engaging the lever between its pivotal connection with the frame and the point of its engagement with the segment whereby upon accidental movement of the road engaging means and links, said segment will permit shock absorbing movement of the lever.

FRANK MESSINA.